US010470055B1

(12) United States Patent
Somashekar et al.

(10) Patent No.: US 10,470,055 B1
(45) Date of Patent: *Nov. 5, 2019

(54) DYNAMIC MITIGATION OF TROPOSPHERIC DUCTING AND REFRACTION BASED INTERFERENCE EVENTS WITH DYNAMIC ANTENNA TILT

(71) Applicant: Sprint Communications Company L.P., Overland Park, KS (US)

(72) Inventors: Sharath Somashekar, Overland Park, KS (US); Ryan Patrick Dreiling, Shawnee, KS (US); Sreekar Marupaduga, Overland Park, KS (US); Rajveen Narendran, Olathe, KS (US); Walter Fred Rausch, Shawnee, KS (US); Andrew M. Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/016,934

(22) Filed: Jun. 25, 2018

Related U.S. Application Data

(63) Continuation of application No. 15/196,941, filed on Jun. 29, 2016, now Pat. No. 10,034,181.

(51) Int. Cl.
*H04W 16/28* (2009.01)
*H01Q 3/02* (2006.01)
(Continued)

(52) U.S. Cl.
CPC ............. *H04W 16/28* (2013.01); *H01Q 3/02* (2013.01); *H04W 24/02* (2013.01);
(Continued)

(58) Field of Classification Search
CPC ............ H04W 16/28; H04W 28/0236; H04W 28/0242; H04W 28/04; H04W 24/02;
(Continued)

(56) References Cited

U.S. PATENT DOCUMENTS 6,304,760 B1  10/2001 Thomson et al.
7,209,760 B2   4/2007 Kochanski et al.
(Continued)

OTHER PUBLICATIONS

Non-Final Office Action dated Apr. 5, 2019 in U.S. Appl. No. 16/234,891, 8 pages.

*Primary Examiner* — Joshua Kading

(57) ABSTRACT

Embodiments of the invention include a system for reducing tropospheric ducting and tropospheric refraction in a wireless telecommunication network. A base station or network component receives weather information and determines if conditions are right for tropospheric ducting or tropospheric refraction. A simultaneous rise in UL interference, call failure rates, and call drop rates in adjacent markets can indicate tropospheric ducting. A rise in UL interference, call failure rates, and call drop rates by devices in one market can indicate tropospheric refraction. Where these UL interferences, call failure rates, and call drop rates occur daily for a similar duration each day, they are treated as being caused by tropospheric propagation and a mitigation routine is implemented through antenna down-tilt.

20 Claims, 9 Drawing Sheets

(51) Int. Cl.
*H04W 24/02* (2009.01)
*H04W 28/04* (2009.01)
*H04W 28/02* (2009.01)
*H04W 88/08* (2009.01)
*H04W 92/10* (2009.01)

(52) U.S. Cl.
CPC ... *H04W 28/0236* (2013.01); *H04W 28/0242* (2013.01); *H04W 28/04* (2013.01); *H04W 88/08* (2013.01); *H04W 92/10* (2013.01)

(58) Field of Classification Search
CPC . H04W 72/0413; H04W 92/10; H04W 88/08; H01Q 3/02; H04L 43/16
See application file for complete search history.

(56) References Cited

U.S. PATENT DOCUMENTS

| | | |
|---|---|---|
| 8,519,886 B2 | 8/2013 | Ainsworth et al. |
| 9,271,189 B2 | 2/2016 | Puthenpura et al. |
| 9,516,513 B2 | 12/2016 | Saegrov et al. |
| 9,729,260 B2 | 8/2017 | Zhu et al. |
| 10,034,181 B1* | 7/2018 | Somashekar ..... H04W 28/0236 |
| 10,117,248 B1 | 10/2018 | Wurtenberger et al. |
| 10,237,770 B2 | 3/2019 | Kleinbeck et al. |
| 2009/0145999 A1 | 6/2009 | Porter |
| 2012/0314592 A1* | 12/2012 | Behravan ............ H04B 7/2656 370/252 |
| 2013/0322289 A1* | 12/2013 | Zhu ..................... H04J 11/0056 370/252 |
| 2014/0056190 A1* | 2/2014 | Qian .................... H04W 24/02 370/280 |
| 2016/0116601 A1 | 4/2016 | Horn et al. |
| 2016/0127943 A1 | 5/2016 | Shaw et al. |
| 2016/0212669 A1 | 7/2016 | Davis |

\* cited by examiner

DYNAMIC MITIGATION OF TROPOSPHERIC DUCTING AND REFRACTION BASED INTERFERENCE EVENTS WITH DYNAMIC ANTENNA TILT

CROSS-REFERENCE TO RELATED APPLICATIONS

This application is a Continuation of U.S. application Ser. No. 15/196,941, filed Jun. 29, 2016, which is incorporated by reference in its entirety.

TECHNICAL FIELD

The present invention relates to wireless telecommunications with antennas and radio frequency (RF) signal interference.

BACKGROUND

Tropospheric propagation refers to the ability of radio energy to propagate farther than planned during periods of stable weather. In one propagation method, when a radio signal encounters an abrupt change in atmospheric density, often caused when cool damp air becomes trapped under warm dry air (known as a temperature inversion), the higher refractive index of the atmosphere will cause the signal shooting outwards to reflect back towards the ground. This effect is known as Tropo-refraction, and it can cause signals from one wireless telecommunications network market ("market") to appear in an adjacent market, by reflecting off this "boundary layer" between the two air masses.

As shown in FIG. 1B, an illustration of tropospheric refraction is shown where a base station in one market (shown as Geo Region A) affects devices in a nearby market (shown as Geo Region B). The devices in Geo Region B encounter interference and noise from the RF transmission of the base station in Geo Region A. The distance between the two markets can be quite significant, upwards to 500 miles, but normally are found to be less than 100 miles. Although the term base station is used, the terms base station, e-Node B (eNB), and base transceiver station (BTS) may be referred to interchangeably. One of ordinary skill in the art knows that the base station, eNB, and BTS refer to various implementations in wireless telecommunication networks.

In FIG. 1C, another illustration of tropospheric refractions is shown. FIG. 1C is similar to FIG. 1B with the difference that FIG. 1C shows only two boundary layers of air. The cool damp air is closest to the ground with a layer of dry warm air existing over the cool damp air. As a result, a signal sent from Geo Region A reflects off the boundary between the cool damp air and dry warm air to affect devices (or user equipment) located in Geo Region B.

Tropospheric refraction is generally impactful to Frequency Division Duplex (FDD) markets through a mechanism of an eNB or BTS in a first market interfering with user equipment (UE) in a second market. This interference is the result of an increase in call failure rate (CFR) and call drop rate (CDR) without an increase in noise at the eNB or BTS. The interference my also impact time division duplex (TDD) markets where signals in one market impact user equipment in the second market. The interference may appear reciprocal due to the number of user equipment involved in each market, but this is not always the case. For example, a large network market may interfere with a smaller network market, but not vice versa.

Tropospheric ducting is a related effect that impacts frequencies up to about 8 GHz. Ducting occurs when two boundary layers form in the troposphere, and radio signals get trapped between them. Under these conditions, signals can propagate over 200 miles. This effect predominately occurs between base station locations with antennas that are either in, or can broadcast into, the "ducting layer." Because tropospheric ducting can be a reciprocal effect, it is seen predominately in co-channel Time Division Duplex (TDD) operations. Tropospheric-related interference incidents tend to be short lived, lasting a few hours around sunrise and/or sunset, sometimes re-occurring daily throughout an entire season in reciprocal markets.

Tropospheric ducting is a BTS to BTS direct interference effect that is unique to co-channel TDD operation. The interference from tropospheric ducting may not always be reciprocal due to the number of stations (BTS) involved. For example, a network in Chicago would have a higher number of stations than a network in Grand Rapids, resulting in tropospheric ducting that is not reciprocal.

As shown in FIG. 1A, an illustration of tropospheric ducting is shown where a base station in one market (shown as Geo Region A) affects a base station in a nearby market (shown as Geo Region B). The RF transmission of each base station affects the other base station by causing interference and noise. As for tropospheric ducting, the distance between the two markets can also be quite significant.

The above two tropospheric effects (tropospheric ducting and tropospheric refraction) cause co-channel and other interferences. With increasing deployment in 2.5 GHz on Time-Division Long-Term Evolution (TD-LTE) technology as well as an increase in site densification, tropospheric propagation gains more relevance with RF propagating in one market being seen in another market using the same physical cell identifications (PCIs) and frequencies, leading to co-channel interferences and increased noise resulting in dropped calls. Radio waves from one market enter and travel significant distances within an atmospheric "duct" and can impact a customer's service in a distant market. The long distances that a signal can travel are based on the refractive index over the signal path and radio propagation conditions and coverage. Significant levels of interference for periods of time can disrupt radio communications links.

A solution is needed that can detect and identify tropospheric propagation. A solution is also needed that can reduce or remove tropospheric propagation when it occurs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the invention detail a system for detecting tropospheric propagation in a wireless telecommunication network, and mitigating such tropospheric propagation when it occurs.

In a first aspect, a system for reducing interference in a wireless telecommunication network from tropospheric ducting and tropospheric refraction is provided that includes receiving weather information at a base station or a server, having a processor coupled to a memory, in the wireless telecommunication network. The base station or server operates to determine an occurrence of tropospheric propagation from the weather information. A baseline is established by the base station or the server for an acceptable uplink (UL) interference, call failure rate (CFR), or call drop rate (CDR) for an operation in the wireless telecommunication network. An increase in UL interference, CFR, or CDR is identified by the base station or server when there is the occurrence of tropospheric propagation. First instructions are generated by the base station or server when the UL interference, CFR, or CDR are above respective thresholds of acceptable operation in the wireless telecommunication network. The first instructions are provided from the base station or server to a set of base stations to act on antennas at the set of base stations. Instructive signals are sent from the set of base stations to adjust the antennas to down-tilt by a pre-programmed amount. With the antennas in a down-tilt position, the UL interference, CFR, or CDR caused by tropospheric ducting or tropospheric refraction is reduced.

In another aspect, a system for reducing interference in a wireless telecommunication network from tropospheric ducting and tropospheric refraction is provided that includes operating a wireless telecommunications network including a plurality of network markets. Wireless telecommunications services are provided to users in the network markets. Weather information is received at a base station in a first network market. An occurrence of tropospheric propagation or a condition suitable for the occurrence of tropospheric propagation is determined at the base station. The base station polls, over X2 links, nearby base stations in nearby network markets to determine an increase in uplink (UL) interference, call failure rate (CFR), or call drop rate (CDR) in the nearby network markets. A nearby network market is located within a range of 500 miles or less from the base station in the first network market. With the increase in UL interference, CFR, or CDR, the base station sends instructions over X2 links to the nearby base stations in the nearby network markets where the increase in UL interference, CFR, or CDR has occurred. The nearby base stations send signals to their respective antennas to down-tilt by a respective amount. UL interference, CFR, or CDR is reduced when the respective antennas are in a down-tilt position. Particularly, an effective remediation occurs when the first network market and the nearby network market down tilt their respective antennas.

In yet another aspect, a system for reducing interference in a wireless telecommunication network from tropospheric ducting and tropospheric refraction is provided that includes operating a server, with a processor coupled to a memory, to receive weather information. An occurrence of tropospheric propagation or a condition suitable for the occurrence of tropospheric propagation is determined. The server polls a first set of base stations in a first network market to determine an increase in uplink (UL) interference, call failure rate (CFR), or call drop rate (CDR) in the first network market. With the increase in UL interference, CFR, or CDR in the first network market, the server sends instructions to the first set of base stations. The first set of base stations act on the instructions to change the position of the antennas at the first set of base stations. The antennas down-tilt by a pre-programmed amount to reduce UL interference, CFR, or CDR.

BRIEF DESCRIPTION OF THE DRAWINGS

Embodiments of the invention are illustrated by way of example and not limited in the accompanying figures in which like reference numerals indicate similar elements and in which.

DETAILED DESCRIPTION

Figure 1A:
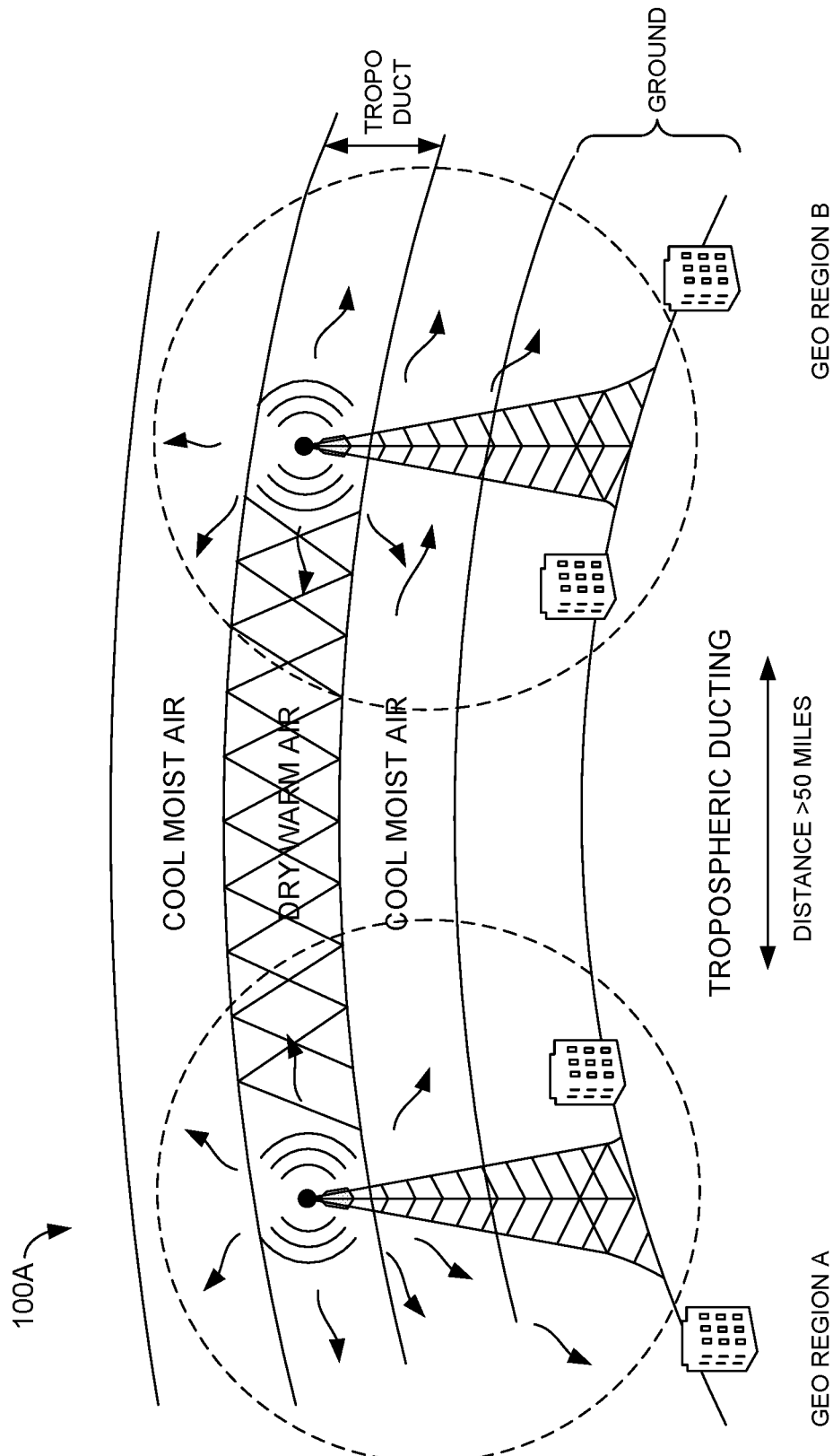
FIG. 1A is an illustration of tropospheric ducting occurring in an environment.

The subject matter of the embodiments of the invention is described with specificity herein to meet statutory requirements. However, the description itself is not intended to limit the scope of this patent. Rather, the inventor has contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In a first aspect, a system for reducing interference in a wireless telecommunication network from tropospheric ducting and tropospheric refraction is provided. A device in the wireless telecommunication network operates to receive weather information. The device is a base station or a server having a processor coupled to a memory. The device operates to determine an occurrence of tropospheric propagation from the weather information. The device establishes a baseline of an acceptable uplink (UL) interference, call failure rate (CFR), or call drop rate (CDR) for an operation in the wireless telecommunication network. The device identifies an increase in UL interference, CFR, or CDR when there is the occurrence of tropospheric propagation. The device generates first instructions when the UL interference, CFR, or CDR are above respective thresholds of acceptable operation in the wireless telecommunication network. The device provides the first instructions to base stations, which cause the base stations to instructively adjust antennas to down-tilt by a pre-programmed amount. The UL interference, CFR, or CDR are subsequently reduced.

In a second aspect, a system for reducing interference in a wireless telecommunication network from tropospheric ducting and tropospheric refraction is provided. The wireless telecommunications network operates and includes a plurality of network markets. The network markets provide wireless telecommunications services to users. A base station operates in a first network market to receive weather information. The base station determines an occurrence of tropospheric propagation or a condition suitable for the occurrence of tropospheric propagation. The base station polls, over X2 links, nearby base stations in nearby network markets to determine an increase in uplink (UL) interference, call failure rate (CFR), or call drop rate (CDR) in the nearby network markets. A nearby network market is located within a range of 200 miles or less from the base station in the first network market. With the increase in UL interference, CFR, or CDR, the base station sends instructions over X2 links to the nearby base stations in the nearby network markets where the increase in UL interference, CFR, or CDR has occurred. The nearby base stations instruct their respective antennas to down-tilt by a respective amount.

In a third aspect, a system for reducing interference in a wireless telecommunication network from tropospheric ducting and tropospheric refraction is provided. A server, with a processor coupled to a memory, operates to receive weather information. The server determines an occurrence of tropospheric propagation or a condition suitable for the occurrence of tropospheric propagation. The server polls a first set of base stations in a first network market to determine an increase in uplink (UL) interference, call failure rate (CFR), or call drop rate (CDR) in the first network market. With the increase in UL interference, CFR, or CDR in the first network market, the server sends instructions to the first set of base stations. The first set of base stations provides instructions or sends signals to down-tilt their respective antennas by a respective amount.

By utilizing techniques to identify the conditions for tropo-ducting (i.e. short for tropospheric ducting) and tropo-refraction (i.e. short for tropospheric refraction), it is possible to estimate the location where these phenomena may occur. By selecting nearby identical wireless markets within a range of 25 to 200 miles, locations can be identified where an RF signal from one location may manifest as interference and noise. Database techniques can be used to identify a set of affected cell towers. The uplink (UL) interference and call failure rate (CFR) can be monitored at the cell towers to provide a candidate list of cell towers for different markets. An increase in UL interference and CFR in reciprocal markets when suitable meteorological conditions exist for tropo-ducting or tropo-refraction will provide a good trigger point to begin antenna down-tilt.

An embodiment of the invention implements techniques to dynamically identify a set of sites for down-tilting antennas using electrical down tilting techniques for a period of time when the tropospheric propagation occurs in the particular area. Once the tropospheric propagation is identified, these sites may receive notification to down-tilt their antennae. This notification can be received using centralized self-optimizing or self-organizing network (CSON) based parameters based on the intensity of RF interference. Or, the notification can be received from a base station that communicates with other base stations over X2 links. CSON is an automation technology that allows a network and its network elements to perform self-configuration, self-optimization, and self-healing. CSON technology can include specific software and tools that are located in base stations and other network devices and databases such as servers. The servers provide a central command to send and receive information as well as to provide instructions based on an occurrence of an event. X2 links are peer-to-peer connections between base stations, especially nearby base stations. In the discussion of base stations in this specification, eNodeBs are included in the group. Each base station has an X2 interface, which enables communications with other base stations. The details of X2 links and X2 interfaces will not be discussed here, but can be gathered from other more detailed documentation.

Figure 2:
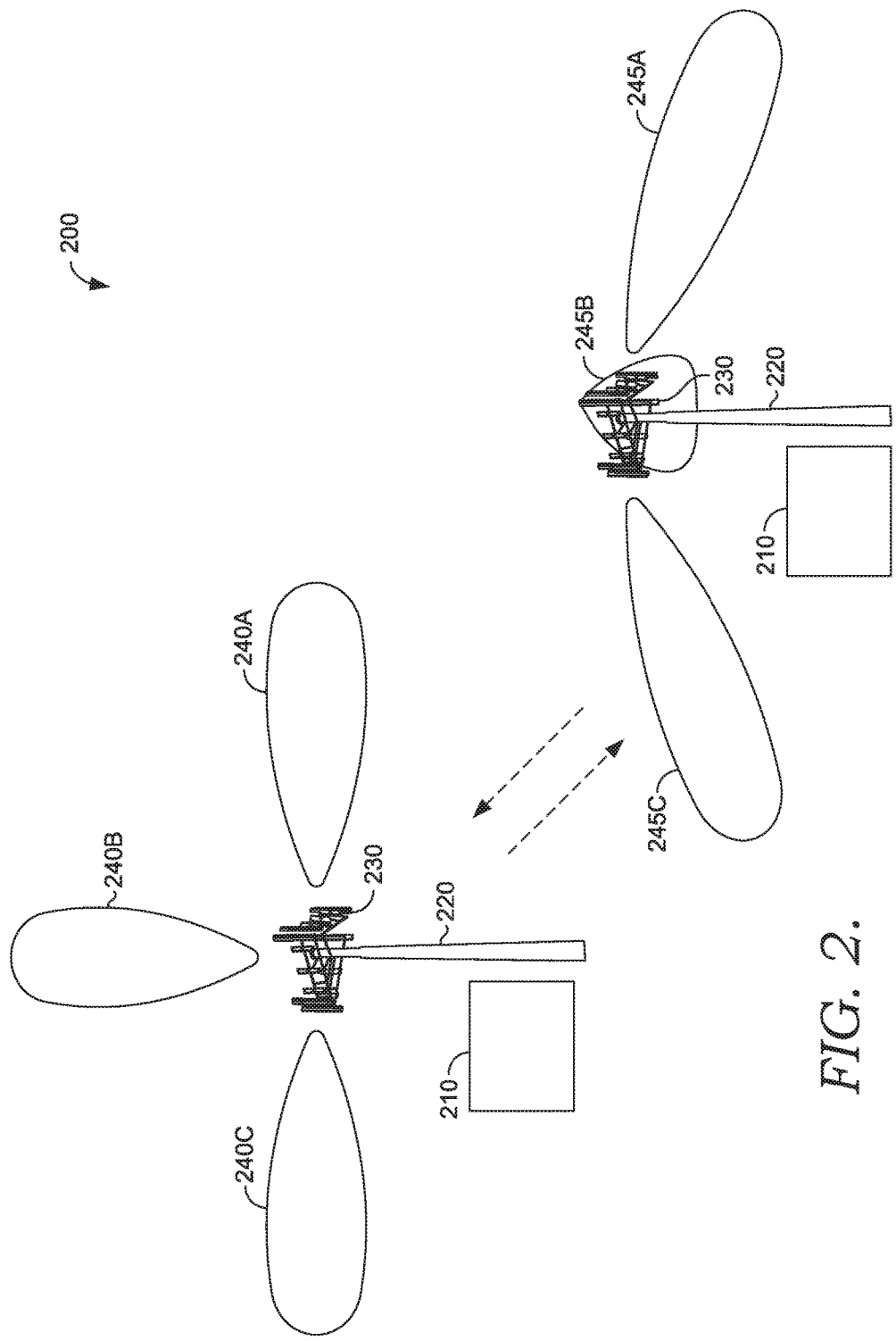
FIG. 2 is an illustration of an exemplary base station with an adjustable antenna that can down-tilt and up-tilt.

FIG. 2 discloses an embodiment of the invention with an exemplary base station 210 with a corresponding antenna 230. The invention is not limited to the illustration as depicted as other embodiments may show multiple base stations or a single base station with multiple antennas. As shown, base station 210 shows a connection to a tower 220, which ultimately includes antenna 230. In normal operation, antenna 230 transmits RF power in a 360 degree pattern as shown by lobes 240A, 240B, and 240C. As one can imagine, antenna 230 can be a cell site that transmits and receives RF signals to wireless devices operating in the coverage area. The coverage area is illustrated by lobes 240A, 240B, and 240C. Although not shown, a number of devices can receive and transmit signals to the cell site via antenna 230. During normal operation, which includes a normal position of antenna 230, antenna 230 can reach a distance based on the amount of RF power generated.

In some instances, antenna 230 may be physically adjusted to down-tilt its position so that lobes 245A, 245B, and 245C point in a downward direction. In this situation, power output of antenna 230 does not reach the same distance or area as in the normal operation (i.e. lobes 240A, 240B, and 240C). Antenna 230 can be placed in the down-tilt position to restrict antenna coverage. In the down-tilt position, the RF signal of antenna 230, through the lobes, will point towards the ground. In this configuration, RF signals have less of a chance of being propagated through the troposphere. The down-tilt position helps avoid sending signals to an area that is unwanted.

Down-tilt of antenna 230 reduces cell interference and also reduces coverage. With down-tilting, a balance has to be made between the amount of the down-tilt versus network performance. In an implementation of an embodiment, one has to be careful not to down-tilt an antenna too far to impact network performance Depending on the beamwidth of lobes 245A, 245B, or 245C, a lobe is angled in a downward direction until an upper −3 dB beam of the lobe reaches or is angled below the horizon. Typically, the larger the vertical beamwidth of the lobe, the more down-tilt will be needed for the upper −3 dB beam to reach or pass below the horizon.

Likewise, if antenna 230 is in a down-tilt position, it can be returned to a normal position. For example, antenna 230 can move positions between lobes 240A, 240B, and 240C and lobes 245A, 245B, and 245C with a remote electrical tilt (RET) motor. The RET motor enables the automatic movement of antenna 230 without a manual adjustment. An operator can operate the RET motor to tilt antenna 230. Additionally, a program can be established in a base station (like base station 210) or a CSON device that can send a signal or instruction to the RET motor to tilt antenna 230. The RET motor can be implemented to be located next to antenna 230 or be located in antenna 230.

Figure 1B:
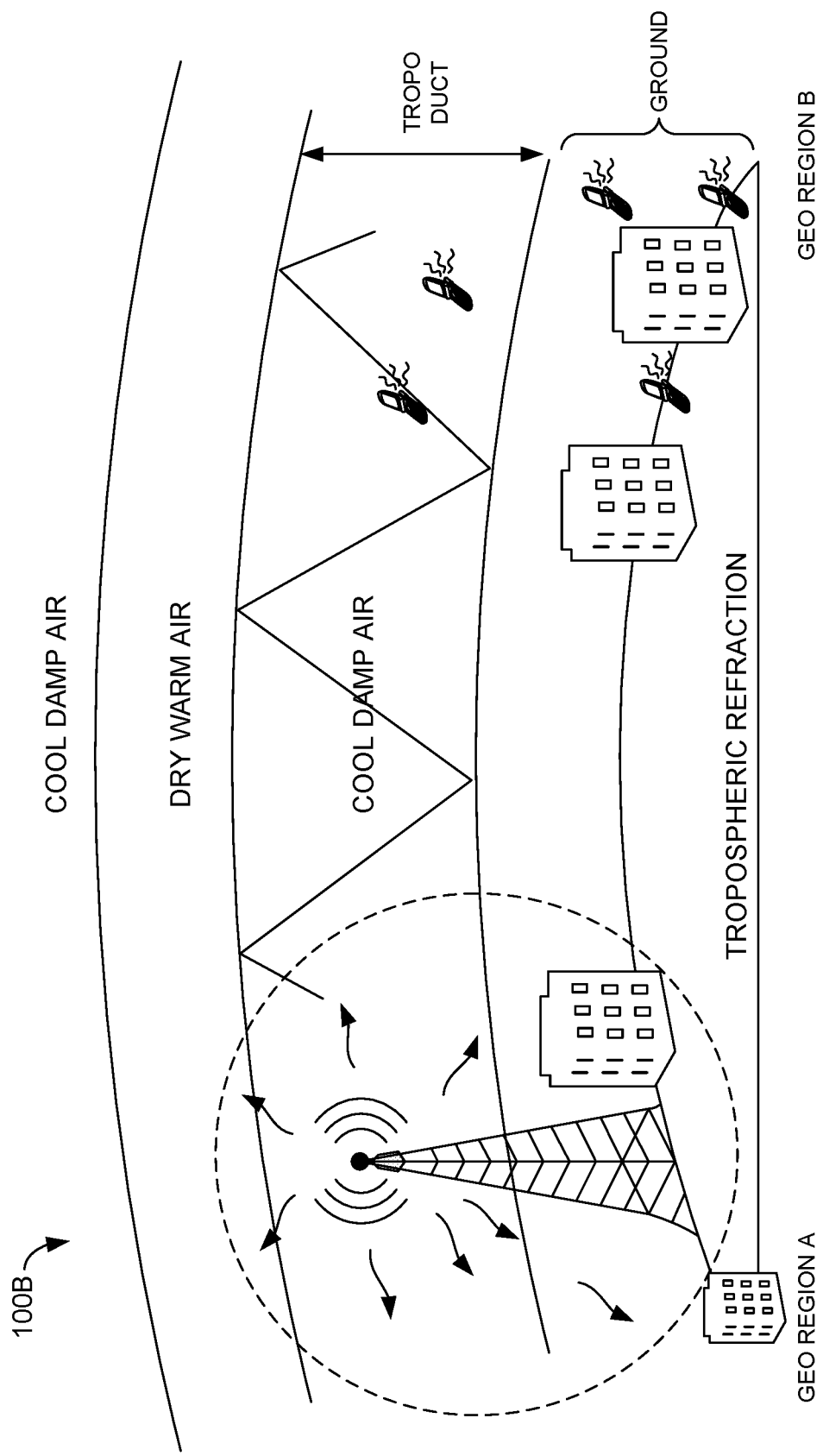
FIG. 1B is an illustration of tropospheric refraction occurring in an environment.
Figure 1C:
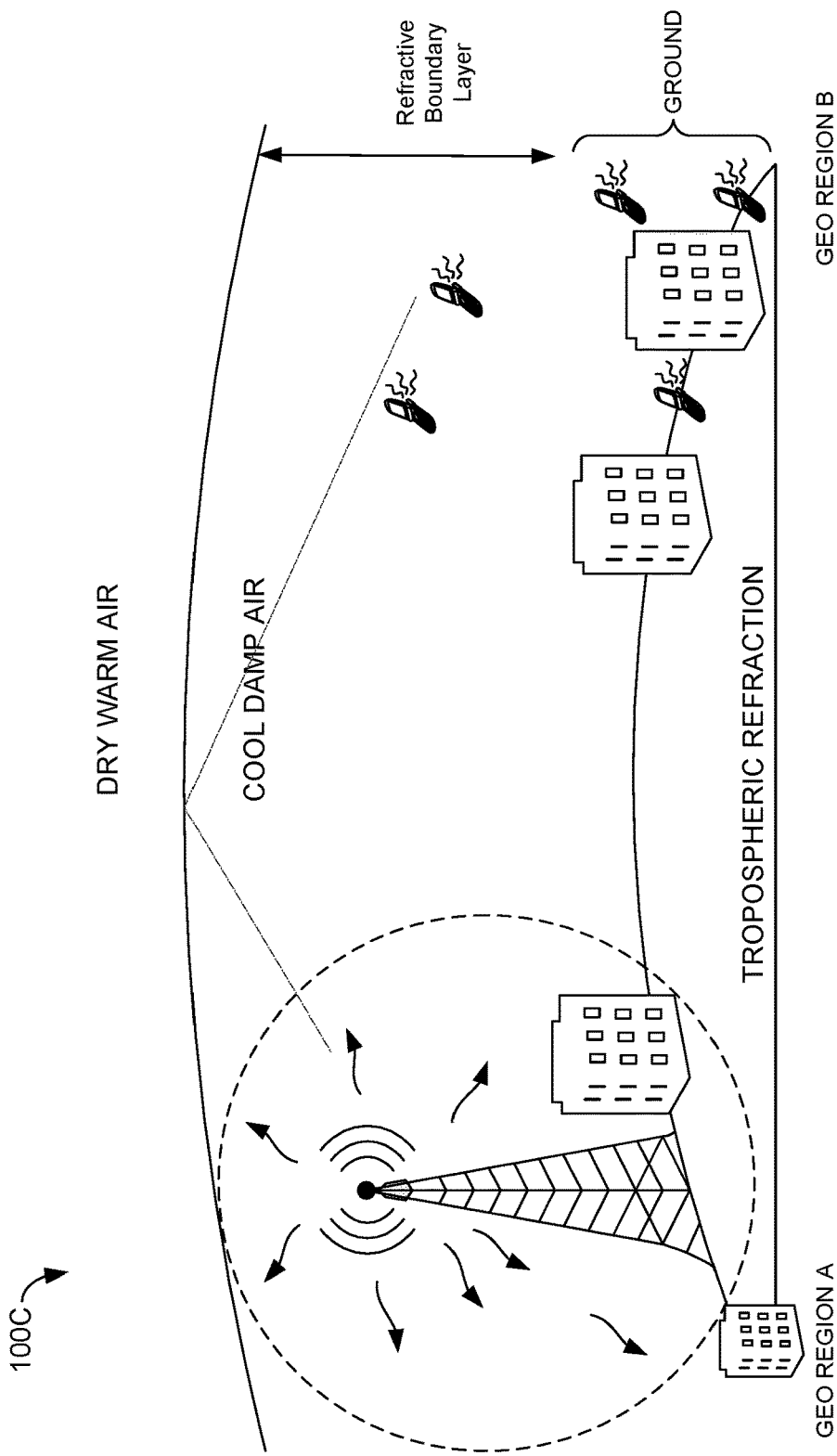
FIG. 1C is another illustration of tropospheric refraction occurring in an environment.
Figure 3A:
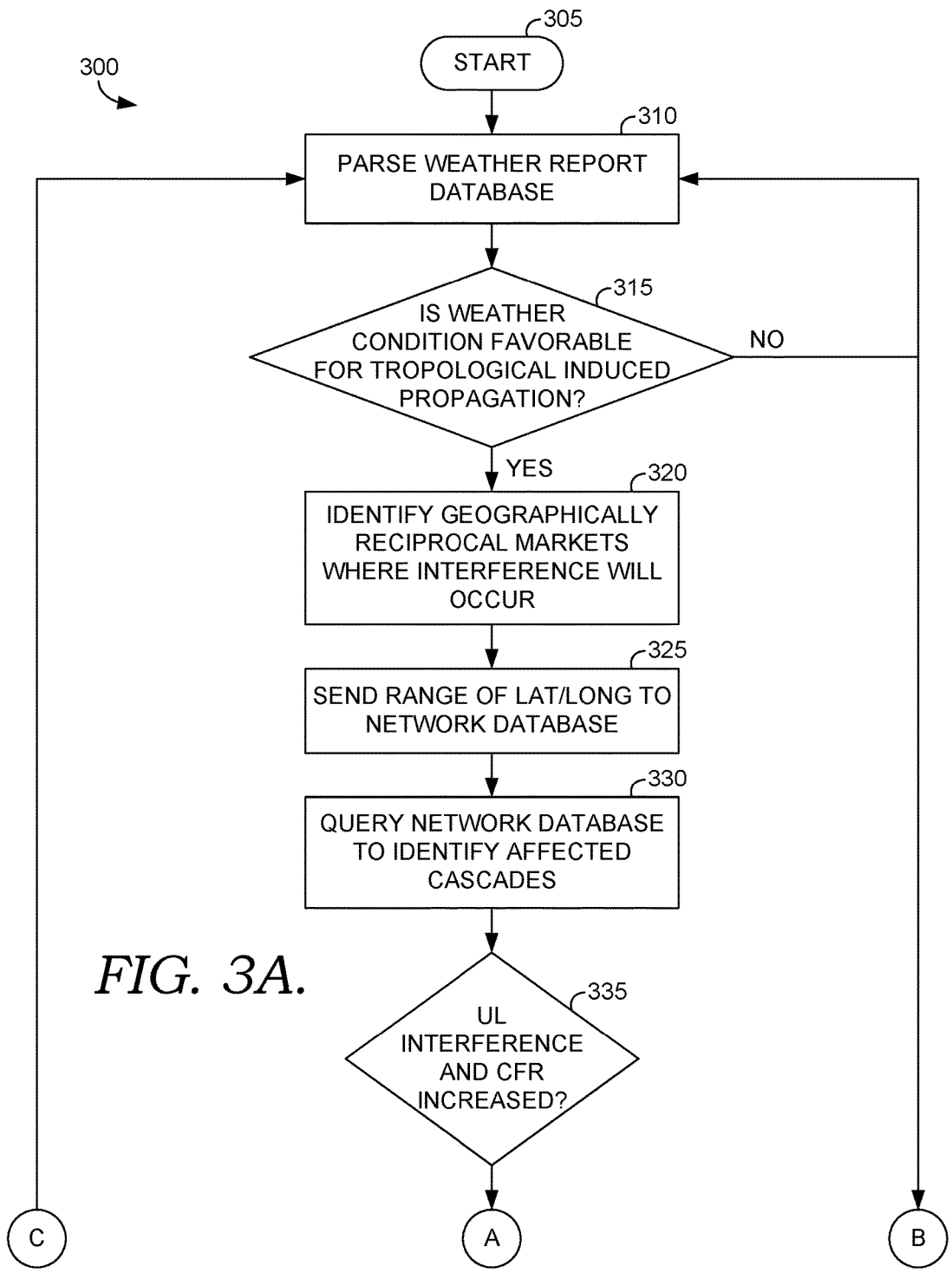
FIGS. 3A and 3B is a process for reducing tropospheric ducting and tropospheric refraction in a wireless telecommunication network.
Figure 3B:
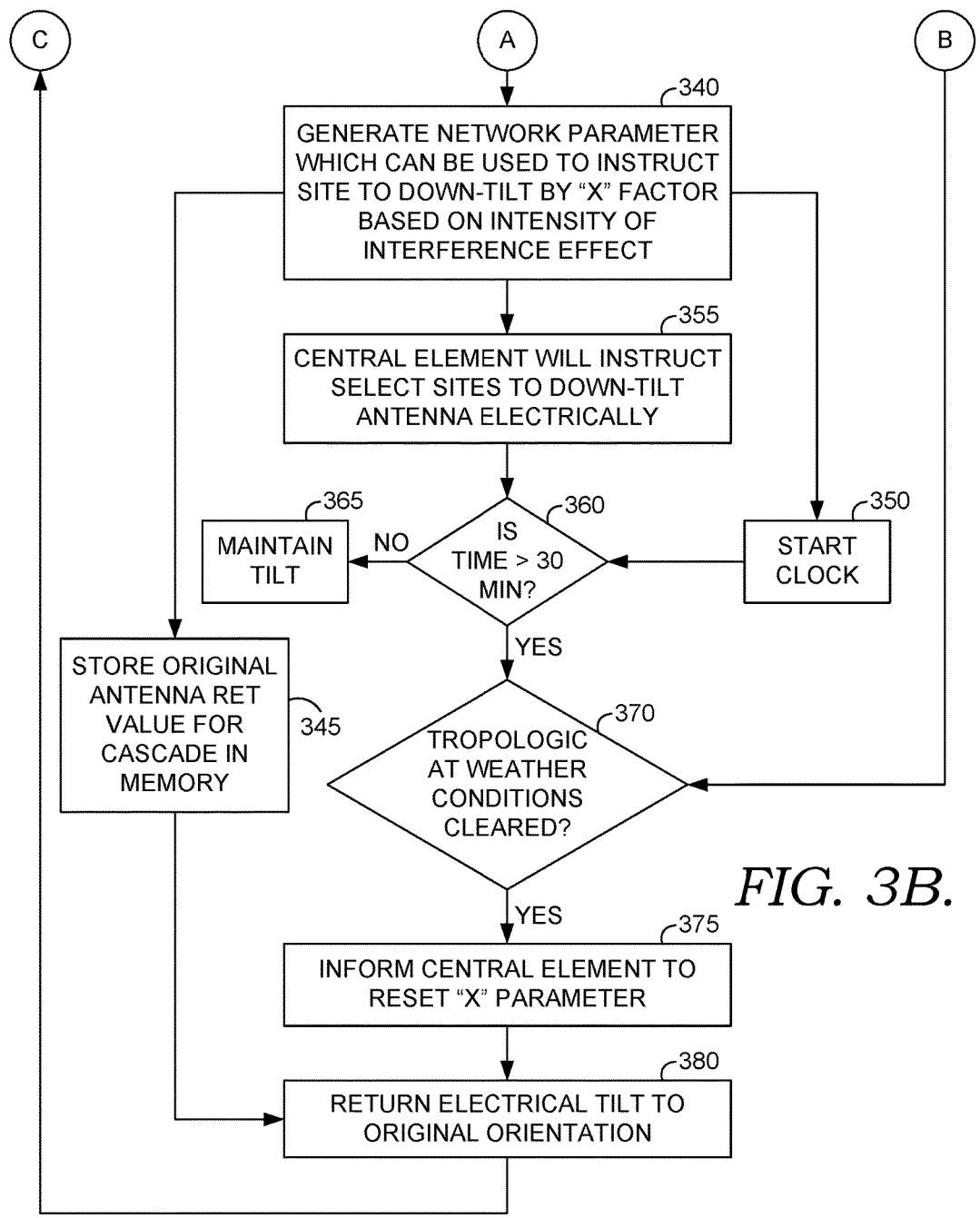

Turning now to FIGS. 3A and 3B, a process for detecting tropospheric propagation and mitigating such occurrences in a wireless telecommunication network is provided in a method 300. In a step 310, base station 210 or a CSON server parses a weather report to determine certain conditions for a Geo Region A in FIGS. 1A and 1B. In a step 315, base station 210 or the CSON server determines if weather conditions are favorable for tropospheric propagation. If there is a condition for tropospheric propagation in Geo Region A, base station 210 or the CSON server identify reciprocal markets where interference (UL interference, CFR, or CDR) might occur, in a step 320. A reciprocal market can be Geo Region B where both wireless network markets share co-channels or both markets are near each other. Reciprocal markets tend to be similar in size, located within 200 miles of each other, and share bands or frequencies. An additional element that identifies when tropospheric propagation is occurring is where the interference occurs periodically, such as at the same time period on a daily basis, or lasts for the same or similar duration on a daily basis. If there is not a condition for tropospheric propagation, base station 210 and the CSON server may indicate that weather conditions are cleared, in a step 370. At this point, depending on an implementation of an embodiment of the invention, a parameter in base station 210 or the CSON server can be reset, in a step 375.

In a step 325, continuing from step 320, base station 210 or the CSON server sends the range of latitude and longitude to a network database. The network database can exist in the CSON, as part of the CSON server, or as part of base station 210 or another base station. In a step 330, base station 210 or the CSON server queries the network database to identify any devices or equipment affected by tropospheric propagation. At this point, in a step 335, base station 210 or the CSON server determines if UL interference or CFR is increased. Although not shown, base station 210 or the CSON server can determine if CDR is increased. Once base station 210 or the CSON server determines an increase in UL interference, CFR, or CDR, a network parameter can be generated, which can be used to instruct base stations to down-tilt their antennas by an amount, as shown in step 340. Particularly, a central element or set of software in base station 210 or the CSON server will instruct other base stations, such as base stations found in Geo Region A and Geo Region B, to down-tilt their antennas through a remote electrical tilt (RET) mechanism, as shown in a step 355. Base station 210 or CSON server can store RET values, as shown in a step 345. In some embodiments, each base station may store its own RET value. So, when another base station, such as base station 210, or the CSON server instructs the base stations to down-tilt their antennas, each base stations can use their respective RET values to down-tilt their own antennas. In other embodiments, the RET values can be stored in the CSON server. In these embodiments, the CSON server can instruct each base station to down-tilt their antennas based on the particular value stored in the CSON server.

In some implementations of embodiments, the amount of time that antennas stay in a down-tilt position can be programmed for a fixed amount of time, as found in steps 360 and 365. When the down-tilt occurs, a clock starts to calculate the down-tilt time, in a step 350. In other situations, the amount of time that the antennas stay in the down-tilt position depends on whether base station 210 or the CSON server continues to detect tropospheric propagation (step 370) along with increases in UL interference, CFR, or CDR.

As stated earlier, once the tropospheric propagation clears, the network parameter (generated in step 340) in base station 210 or the CSON server can be reset, in step 375. At this point, antennas at the various base stations can up-tilt and return to their original orientation or position, as stated in a step 380. Then, the process can begin again with base station 210 or the CSON server parsing a weather report again for another tropospheric propagation event.

As one of ordinary skill in the art understands, no distinction has been made to the types of tropospheric propagation that might occur in the wireless network(s). However, it is understood that a wireless network might encounter tropospheric ducting (tropo-ducting) or tropospheric refraction (tropo-refraction). The mitigation techniques will be similar because in each situation base station 210 or the CSON server is monitoring for an increase in UL interference, CFR, CDR, or some combination of each.

Figure 4:
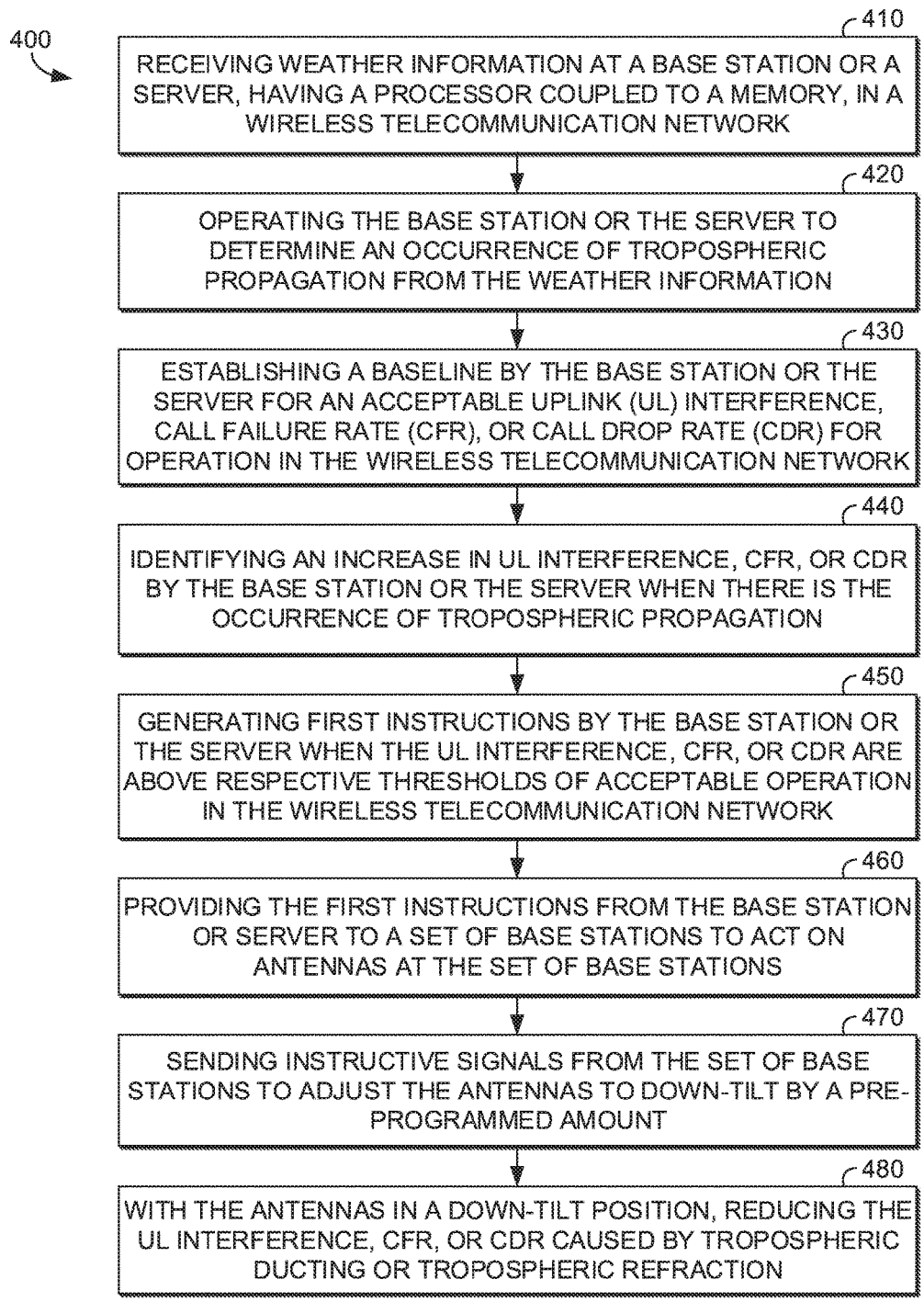
FIG. 4 is a second process for reducing tropospheric ducting and tropospheric refraction in a wireless telecommunication network.

In FIG. 4, a process for detecting tropospheric propagation and mitigating such occurrences in a wireless telecommunication network is provided in a method 400. In a step 410, base station 210 or a CSON server receives weather information in a wireless telecommunication network such as Geo Region A or Geo Region B in FIGS. 1A and 1B. In a step 420, base station 210 or the CSON server determines an occurrence of tropospheric propagation from weather information. Base station 210 or the CSON server establishes a baseline of acceptable UL interference, CFR, or CDR for operation in Geo Region A, in a step 430. In a step 440, base station 210 or the CSON server identifies an increase in UL interference, CFR, or CDR when there is the occurrence of tropospheric propagation. In a step 450, base station 210 or the CSON server generates a first set of instructions when the UL interference, CFR, or CDR are above their respective thresholds of acceptable operation in Geo Region A. Base station 210 or the CSON server provides the first set of instructions to a set of base stations that are located within Geo Region A with base station 210 or located within in Geo Region B. Base station 210 or the CSON server provides the first set of instructions to the base stations to act on the respective antennas at the base stations, in a step 460. In a step 470, the set of base stations send instructive signals to their respective antennas to move into a down-tilt position by a pre-programmed amount. This movement of the antennas to the down-tilt position is done through a RET mechanism with RET values. In a step 480, with the antennas in a down-tilt position, UL interference, CFR, and CDR are reduced, mitigating the tropospheric ducting or tropospheric refraction.

Figure 5:
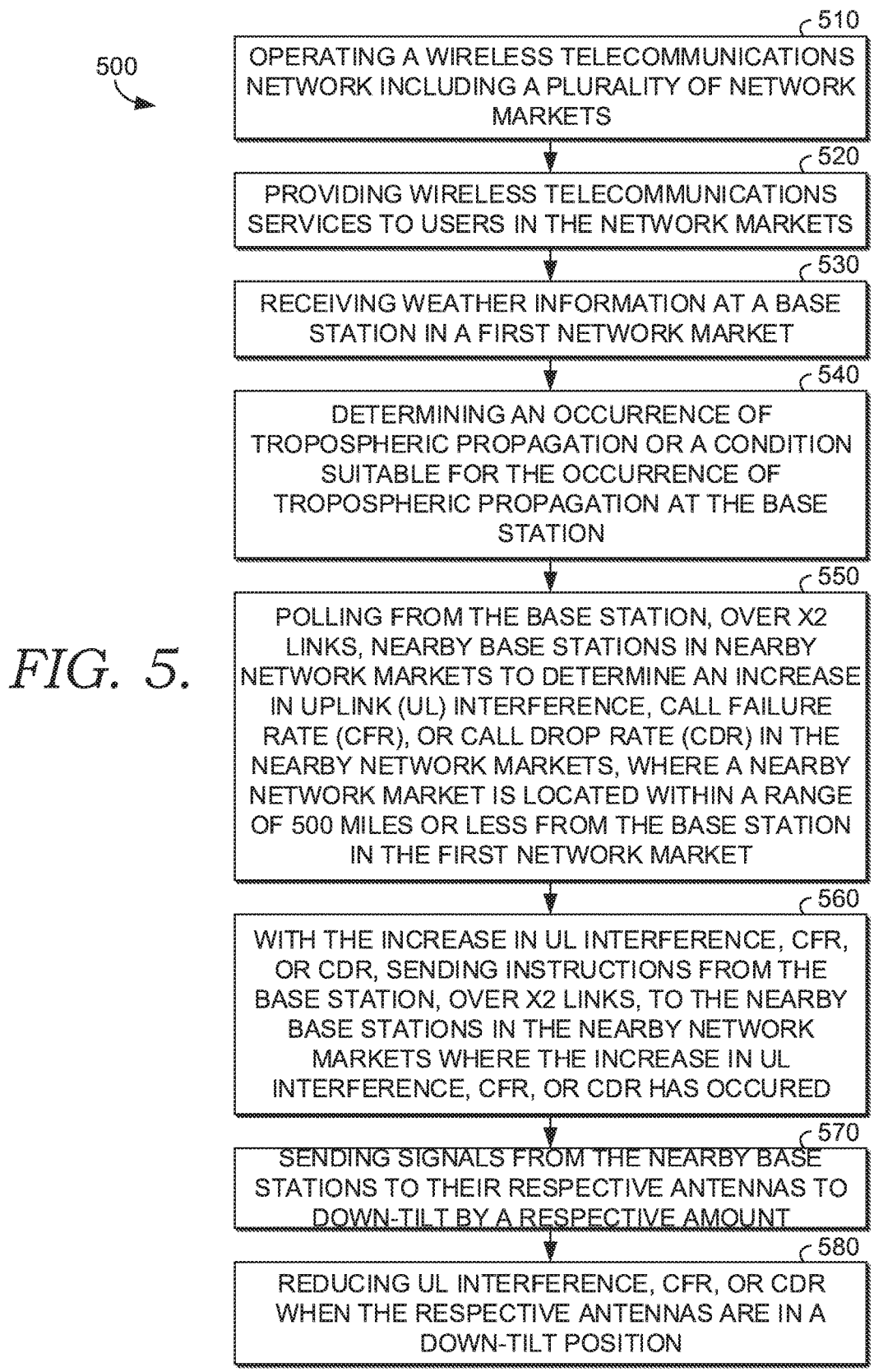
FIG. 5 is a third process for reducing tropospheric ducting and tropospheric refraction in a wireless telecommunication network.

Turning now to FIG. 5, a process for detecting tropospheric propagation and mitigating such occurrences in a wireless telecommunication network is provided in a method 500. In a step 510, a wireless network operates and includes network markets, such as Geo Region A and Geo Region B in FIGS. 1A and 1B. In a step 520, wireless telecommunication services are provided to users in Geo Region A and Geo Region B. Weather information is received at a base station in Geo Region A, in a step 530. The base station determines an occurrence of tropospheric propagation or a condition suitable for the occurrence of tropospheric propagation, in a step 540. In a step 550, the base station polls, over X2 links, nearby base stations in Geo Region A or Geo Region B to determine an increase in UL interference, CFR, or CDR in Geo Region A or Geo Region B. The nearby base stations are located within 200 miles from the base station. In a step 560, with the increase in UL interference, CFR, or CDR, the base station sends instructions over the X2 links to the nearby base stations where the increase in UL interference, CFR, or CDR has occurred. In a step 570, the nearby base stations send signals to their respective antennas to down-tilt by a respective amount. In a step 580, the UL interference, CFR, or CDR is reduced when the antennas are in the down-tilt position.

Figure 6:
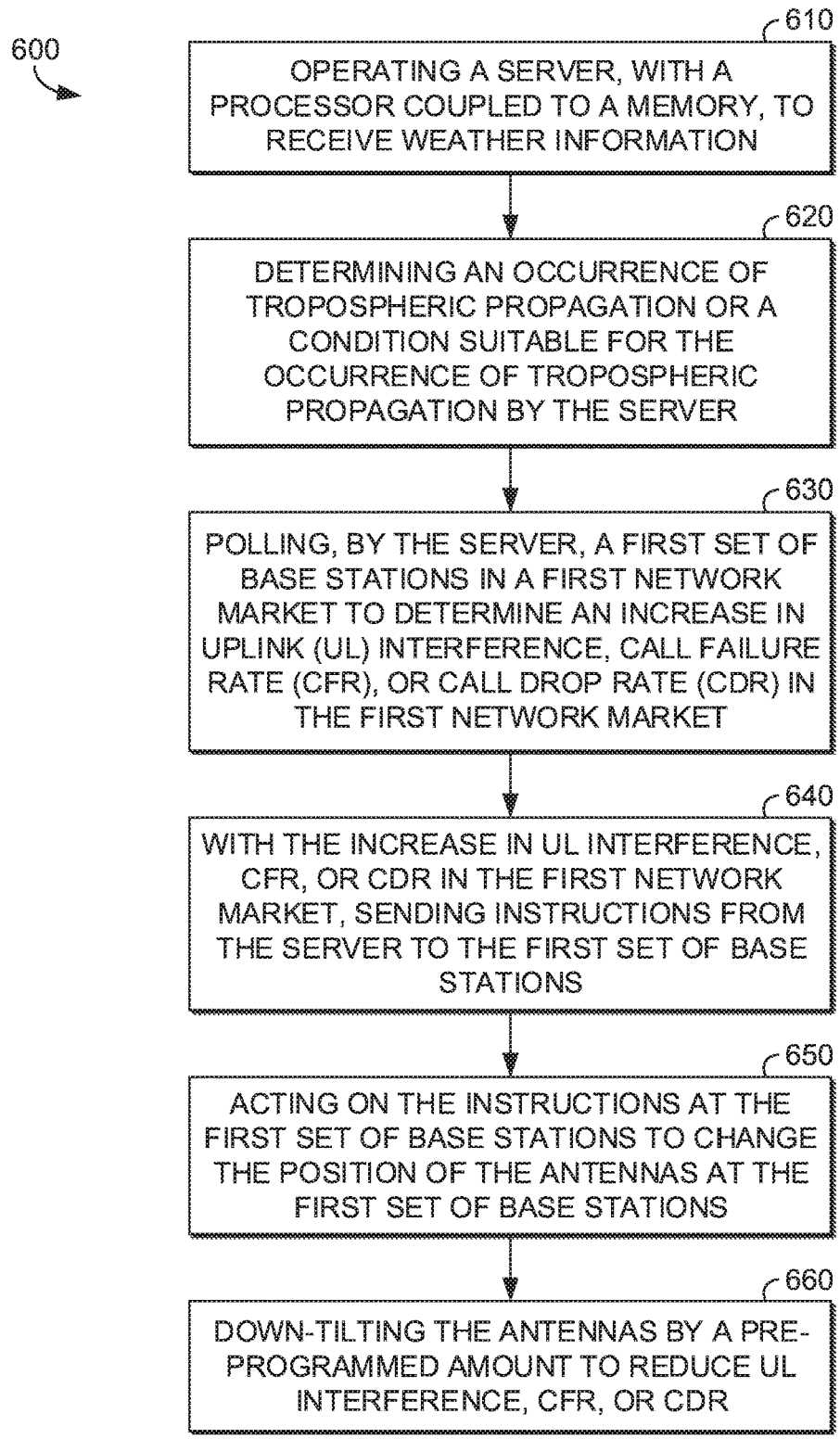
FIG. 6 is a fourth process for reducing tropospheric ducting and tropospheric refraction in a wireless telecommunication network.

In FIG. 6, a process for detecting tropospheric propagation and mitigating such occurrences in a wireless telecommunication network is provided in a method 600. In a step 610, a CSON server operates to receive weather information. The CSON server is part of a CSON that operates in conjunction with the wireless telecommunication network. The CSON enables the wireless telecommunication network to be self-configuring, self-optimizing, and self-healing. Otherwise, manual intervention is required whenever equipment is added or removed from the wireless telecommunication network. For example, with the CSON, a base station can be added to the wireless telecommunication network and the CSON technology configures the new base station as well as re-configures the existing base stations to account for this new base station. Likewise, the base stations are optimized to handle wireless traffic.

In a step 620, the CSON server determines an occurrence of tropospheric propagation or a condition suitable for the occurrence of tropospheric propagation. The CSON server polls a first set of base stations in a first network market to determine an increase in UL interference, CFR, or CDR in the first network market, in a step 630. With the increase in UL interference, CFR, or CDR in the first network market, the CSON server sends instructions to the first set of base stations, in a step 640. In a step 650, the first set of base stations act on the instructions to change the position of the antennas at the first set of base stations. In a step 660, the antennas at each respective base station down-tilt by a pre-programmed amount to reduce UL interference, CFR, or CDR.

While the embodiments of the invention are susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the embodiments of the invention.

The embodiments of the invention have been described in relation to detecting and mitigating tropospheric propagation, which is intended in all respects to be illustrative rather than restrictive. Alternative embodiments will become apparent to those of ordinary skill in the art to which the invention pertains without departing from its scope.

The invention claimed is:

1. A system for reducing interference in a wireless telecommunication network from tropospheric ducting and tropospheric refraction, comprising:
    a device in the wireless telecommunication network operable to receive weather information, wherein the device is a base station or the device is a server having a processor coupled to a memory;
    the device operable to determine an occurrence of tropospheric propagation from the weather information;
    the device establishes an acceptable uplink (UL) interference, an acceptable call failure rate (CFR), or an acceptable call drop rate (CDR) for an operation of one or more base stations in the wireless telecommunication network;
    the device identifies an increase in a UL interference, a CFR, or a CDR in the wireless telecommunication network when there is the occurrence of tropospheric propagation;
    the device generates one or more first instructions when the UL interference, CFR, or CDR is respectively above the acceptable UL interference, the acceptable CFR, or the acceptable CDR in the wireless telecommunication network; and
    the device provides the one or more first instructions to the one or more base stations, which cause the one or more base stations to instructively adjust one or more antennas to down-tilt by a pre-programmed amount, wherein the UL interference, CFR, or CDR is subsequently reduced to at least the acceptable UL interference, the acceptable CFR, or the acceptable CDR.

2. The system of claim 1, wherein the device provides the one or more first instructions to the one or more base stations over X2 links.

3. The system of claim 1, further comprising the device generates one or more second instructions when the UL interference, CFR, or CDR fall to at least the acceptable UL interference, the acceptable CFR, or the acceptable CDR.

4. The system of claim 3, further comprising the device provides the one or more second instructions to the one or base stations, wherein the one or more second instructions cause the one or more antennas to up-tilt and return to their original position.

5. The system of claim 1, further comprising the one or more antennas return their original position after a fixed amount of time.

6. The system of claim 1, wherein the occurrence of tropospheric propagation occurs when a refractive index of a signal path of a base station increases.

7. The system of claim 1, wherein the server is a component in a centralized self-optimizing network (CSON), wherein the CSON monitors an operation of a plurality of base stations and provides various instructions to the plurality of base stations to manage the operation of the plurality of base stations.

8. The system of claim 1, wherein tropospheric propagation includes tropospheric ducting and tropospheric refraction.

9. A system for reducing interference in a wireless telecommunication network from tropospheric ducting and tropospheric refraction, comprising:
    a device in the wireless telecommunication network operable to receive weather information, wherein the device is a base station or the device is a server having a processor coupled to a memory;
    the device operable to determine an occurrence of tropospheric propagation from the weather information;
    the device establishes an acceptable uplink (UL) interference, an acceptable call failure rate (CFR), or an acceptable call drop rate (CDR) for an operation of a plurality base stations in the wireless telecommunication network;
    the device identifies an increase in a UL interference, a CFR, or a CDR in the wireless telecommunication network when there is the occurrence of tropospheric propagation;
    the device generates one or more first instructions when the UL interference, CFR, or CDR for a first group of the plurality of based stations is respectively above the acceptable UL interference, the acceptable CFR, or the acceptable CDR in the wireless telecommunication network;
    the device provides the one or more first instructions to the first group of the plurality of base stations, which cause the first group of the plurality of base stations to instructively adjust one or more first antennas to down-tilt by a pre-programmed amount, wherein the UL interference, CFR, or CDR is subsequently reduced to at least the acceptable UL interference, the acceptable CFR, or the acceptable CDR;
    the device generates one or more second instructions when the UL interference, CFR, or CDR for a second group of the plurality of based stations is respectively above the acceptable UL interference, the acceptable CFR, or the acceptable CDR in the wireless telecommunication network; and
    the device provides the one or more second instructions to the second group of the plurality of base stations, which cause the second group of the plurality of base stations to instructively adjust one or more second antennas to down-tilt by a pre-programmed amount, wherein the UL interference, CFR, or CDR is subsequently reduced to at least the acceptable UL interference, the acceptable CFR, or the acceptable CDR, wherein the first group is located in a first sub-network separate from the second group located in a second sub-network.

10. The system of claim 9, further comprising the one or more first antennas or the one or more second antennas return their original position after a fixed amount of time.

11. The system of claim 9, wherein the occurrence of tropospheric propagation occurs when a refractive index of a signal path of a base station increases.

12. The system of claim 9, wherein the server is a component in a centralized self-optimizing network (CSON), wherein the CSON monitors an operation of the plurality of base stations and provides various instructions to the plurality of base stations to manage the operation of the plurality of base stations.

13. The system of claim 9, wherein tropospheric propagation includes tropospheric ducting and tropospheric refraction.

14. A system for reducing interference in a wireless telecommunication network from tropospheric ducting and tropospheric refraction, comprising:
 a server, with a processor coupled to a memory, operable to receive weather information;
 the server determines an occurrence of tropospheric propagation or a condition suitable for the occurrence of tropospheric propagation;
 the server polls a first set of base stations in a first network market to determine a first increase in uplink (UL) interference, call failure rate (CFR), or call drop rate (CDR) in the first network market;
 with the first increase in UL interference, CFR, or CDR in the first network market, the server sends instructions to the first set of base stations that cause the first set of base stations to down-tilt their respective antennas by a respective amount; and
 the sever polls a second set of base stations in a second network market to identify a second increase in UL interference, CFR, or CDR in the second network market, wherein the first network market and second network market communicate with each other over at least co-channel time division duplex (TDD) operations.

15. The system of claim 14, further comprising, with the second increase in UL interference, CFR, or CDR in the second network market, the server sends instructions to the second set of base stations that cause the second set of base stations to down-tilt their respective antennas by a separate respective amount.

16. The system of claim 15, further comprising the server polls the first set of base stations in the first network market to identify a first decrease in UL interference, CFR, or CDR in the first network.

17. The system of claim 16, further comprising, with the first decrease in UL interference, CFR, or CDR in the first network market, the server sends instructions to first set of base stations that cause the first set of base stations to up-tilt their respective antennas by the respective amount.

18. The system of claim 17, further comprising the server polls the second set of base stations in the second network market to identify a second decrease in UL interference, CFR, or CDR in the second network.

19. The system of claim 18, further comprising, with the second decrease in UL interference, CFR, or CDR in the second network, the server sends instructions to second set of base stations that cause the second set of base stations to up-tilt their respective antennas by the separate respective amount.

20. The system of claim 19, wherein the server is a component in a centralized self-optimizing network (CSON), wherein the CSON monitors an operation of a plurality of base stations and provides various instructions to the plurality of base stations to manage the operation of the plurality of base stations.

* * * * *